US007475122B2

(12) United States Patent
Azpitarte

(10) Patent No.: US 7,475,122 B2
(45) Date of Patent: Jan. 6, 2009

(54) SYSTEM FOR REMOTELY MANAGING MAINTENANCE OF A SET OF FACILITIES

(76) Inventor: Jean-Patrick Azpitarte, 27 rue de la Pepiniere, 78150 Le Chesnay (FR)

( * ) Notice: Subject to any disclaimer, the term of this patent is extended or adjusted under 35 U.S.C. 154(b) by 999 days.

(21) Appl. No.: 09/971,946

(22) Filed: Oct. 4, 2001

(65) Prior Publication Data
US 2002/0059412 A1 May 16, 2002

(30) Foreign Application Priority Data
Oct. 4, 2000 (FR) .................................. 00 12675

(51) Int. Cl.
G06F 15/173 (2006.01)
(52) U.S. Cl. .................... 709/217; 709/218; 709/220; 709/223; 709/224; 702/182; 702/183; 702/184; 702/187; 702/188; 714/25; 714/26; 714/46; 714/57; 705/7; 705/8; 705/9
(58) Field of Classification Search ................ 709/223, 709/224, 225; 714/47; 702/188
See application file for complete search history.

(56) References Cited

U.S. PATENT DOCUMENTS

| 4,568,909 | A | * | 2/1986 | Whynacht ................ 187/393 |
| 4,703,325 | A | * | 10/1987 | Chamberlin et al. ... 340/825.36 |
| 5,216,612 | A | * | 6/1993 | Cornett et al. .............. 700/96 |
| 5,404,503 | A | | 4/1995 | Hill et al. |
| 5,687,212 | A | * | 11/1997 | Kinser et al. ............. 379/9.03 |
| 5,859,778 | A | | 1/1999 | Kuroda et al. |
| 5,920,846 | A | * | 7/1999 | Storch et al. ................... 705/7 |
| 6,236,332 | B1 | * | 5/2001 | Conkright et al. ............ 340/3.1 |
| 6,298,308 | B1 | * | 10/2001 | Reid et al. ..................... 702/56 |
| 6,437,692 | B1 | * | 8/2002 | Petite et al. ................. 340/540 |
| 6,477,667 | B1 | * | 11/2002 | Levi et al. ..................... 714/57 |
| 6,553,336 | B1 | * | 4/2003 | Johnson et al. ............. 702/188 |
| 6,788,765 | B1 | * | 9/2004 | Beamon .................. 379/27.01 |
| 6,845,148 | B1 | * | 1/2005 | Beamon ..................... 379/9.02 |
| 7,269,569 | B2 | * | 9/2007 | Spira et al. ..................... 705/7 |
| 2003/0005107 | A1 | * | 1/2003 | Dulberg et al. ............. 709/223 |
| 2003/0172002 | A1 | * | 9/2003 | Spira et al. .................... 705/27 |

FOREIGN PATENT DOCUMENTS

EP 0822473 2/1998

* cited by examiner

Primary Examiner—Bunjob Jaroenchonwanit
Assistant Examiner—Dohm Chankong
(74) Attorney, Agent, or Firm—Bachman & LaPointe, P.C.

(57) ABSTRACT

This system comprises local monitoring units installed in close proximity to the facilities to be monitored, each of which comprises a device for detecting facility malfunctions; a first computer made available to the facility maintenance company, connected to the local units through a transmission network for receiving and processing fault information transmitted from the local units; a second computer made available to a facility management company, which receives the same information as the first computer from the local units; each local unit being associated with a facility and further comprising a control device for allowing a maintenance engineer to signal the beginning and the end of an inspection of the associated facility, these events being transmitted to the computers which comprise a device for storing all information transmitted by the local units.

12 Claims, 3 Drawing Sheets

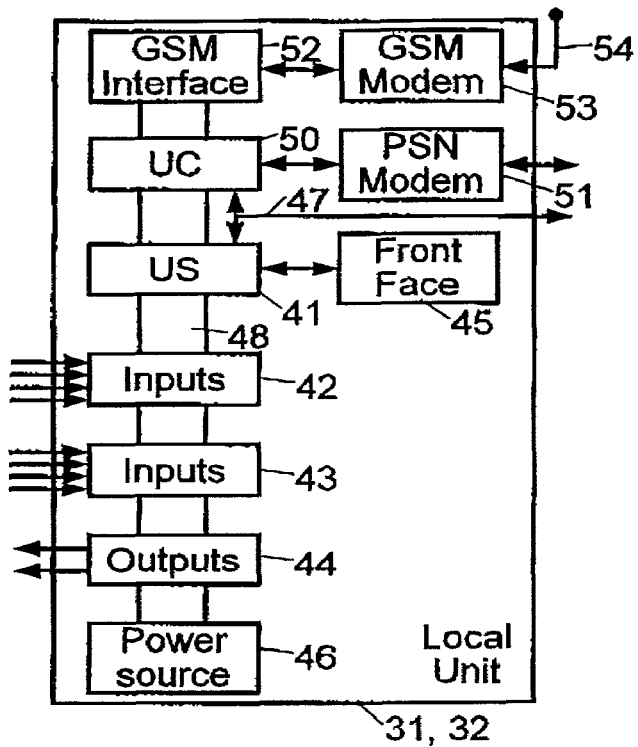
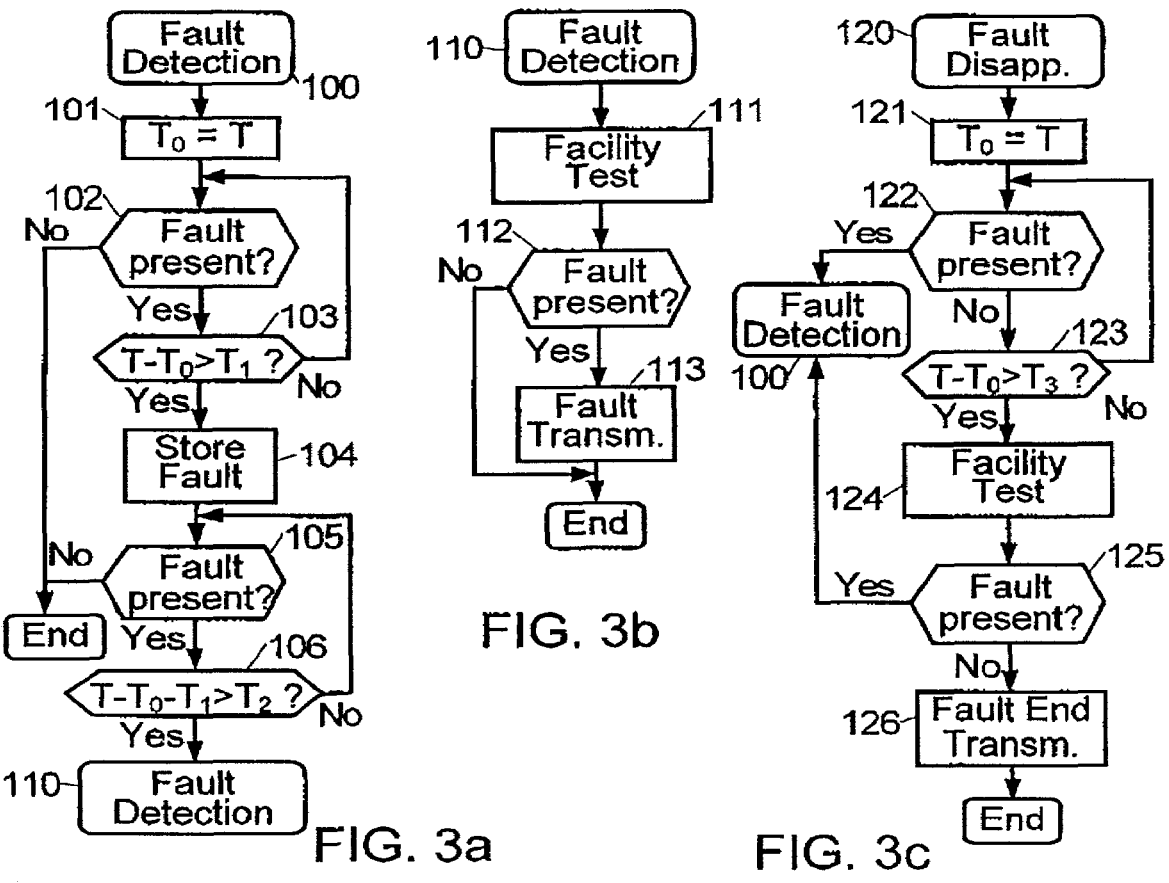
FIG. 2
FIG. 3a
FIG. 3b
FIG. 3c

SYSTEM FOR REMOTELY MANAGING MAINTENANCE OF A SET OF FACILITIES

BACKGROUND OF THE INVENTION

1. Field of the Invention

The present invention relates to a system for remotely managing the maintenance of a set of facilities.

More particularly, although not exclusively, it applies to facilities installed in buildings, such as elevators, force-ventilation, air-conditioning and district heating systems, automatic parking lot gates, and the like.

2. Description of the Related Art

Presently, the maintenance of such facilities is ensured by maintenance companies that are bound through a maintenance contract to the company that manages such facilities. This contract provides for servicing, repairing and maintaining the facilities by maintenance engineers on a regular basis, and specifies the modalities and scheduling for inspection by these engineers.

In addition, there are known devices designed for monitoring a set of facilities operational parameters and thus, for detecting malfunctions and failures and for transmitting this information, for example over a telephone network, to the company in charge of the maintenance of such facilities. Thus, only one maintenance company may perform a real-time monitoring of the operation of several facilities distributed across far apart geographical locations and rapidly dispatch maintenance personnel on the site where the failure has been detected.

However, these devices do not allow to guarantee the facility manager or owner that the response time for servicing facility or that the frequency with which maintenance operations are performed, which are specified in the maintenance contract, are complied with by the maintenance company. In addition, if the contract provides for specific response or restarting times according to failure type, these devices do not allow the compliance with these times to be checked.

In addition, these devices frequently provide false alarms which induce unnecessary visits of maintenance personnel.

SUMMARY OF THE INVENTION

An object of the present invention is to overcome such drawbacks. For that purpose, the invention provides a system for remotely managing the maintenance of a set of facilities by a maintenance company and a company managing the facilities, wherein the system comprises local monitoring units installed in proximity thereto and each comprising means to perform measurements on the operation of the facilities and thereby to detect malfunctions, and a computer made available to the maintenance company, which computer is connected to the local units through a communication network for receiving and processing information about the malfunctions detected by the local units.

According to the present invention, this system is characterized in that it further comprises a computer made available to the facility managing company, which receives the same information as the maintenance company's computer from the local units, each local unit associated with at least one facility further comprising control means allowing a maintenance engineer to signal the beginning and end of his inspection of the associated facility, these events being transmitted to the maintenance company and managing company's computers, said computers comprising means for storing all information transmitted by the local units.

According to these provisions, not only can the facility managing company be warned of failures occurring in the facilities it manages, but it is also able to follow the maintenance and servicing operations carried out by the maintenance company. Thus, it is able to check whether the latter fulfills the obligations agreed upon in the maintenance contract for the considered facilities.

This follow-up of maintenance for each facility may both concern the frequency and duration of maintenance inspections, the number of failures, the cause of such failures, the response and servicing times of a maintenance engineer for each servicing operation, and the unavailability duration of a facility due to servicing.

Preferably, each local unit comprises means for preventing information relating to malfunctions detected between the beginning and end of the servicing operation of a maintenance engineer, signaled by said control means, from being transmitted to the computers. Thus, the maintenance engineer may work freely, and the transmission of a large amount of unnecessary information is avoided.

Advantageously, each computer is associated with a database gathering all information pertaining to the facilities and their maintenance, and information transmitted by the local units.

These databases make it possible to identify the most frequently failed facilities as well as the most frequent failures. They can also be used for establishing a repair and overhaul plan to make the monitored facilities more reliable.

According to one feature of the present invention, the computers used by the managing company and the maintenance company in charge of the monitored facilities, comprise:

means for counting the number of maintenance inspections carried out for each monitored facility during a predetermined period of time, comparing this number to a first predetermined threshold, and for transmitting a first maintenance fault signal if the number of inspections does not reach this threshold at the end of said predetermined period of time, means for computing the total duration of the maintenance operations on each monitored facility during said predetermined period of time, for comparing this total duration to a second predetermined threshold, and for sending a second maintenance fault signal if this total duration is not at least equal to a second threshold at the end of said predetermined period of time, means for comparing the response time of a maintenance engineer for a facility detected as malfunctioning with a third predetermined threshold, and sending a third maintenance fault signal when this threshold is exceeded, and means for comparing the time to restart of a facility that had previously been placed out of service after a failure or overhauling of this facility, with a fourth predetermined threshold, and for sending a fourth maintenance fault signal when this threshold is exceeded.

All of these thresholds are advantageously those that had been specified in the maintenance contract binding the maintenance company to the facility managing company.

Thus, the commitment made by the maintenance company to the managing company is automatically checked. It can also be provided that the monitored facility manager's computer comprises means for computing penalties to be applied to the maintenance company after a maintenance fault signal has been sent, as a function thereof.

Preferably, the first and second predetermined thresholds can be set according to the monitored facility. Similarly, the third and fourth predetermined thresholds are defined according to the detected malfunction.

In this respect, certain failures require a quick response of maintenance personnel. This is the case, for example, when the monitored facility is an elevator and when a person is caught in the broken down elevator. In this case, the local unit that monitors each elevator further comprises means for detecting that a person is caught in the broken down elevator and for transmitting an alarm signal notifying this event to the maintenance company's computer and to the managing company's computer.

This is also the case when the monitored facility is a force-ventilation system, also known as controlled mechanical ventilation, in a building. In such a system, force-ventilation ensures, in particular, extraction of combustion gazes from individual boilers installed in an apartment building. This system is normally equipped with a safety device for interrupting boiler operation when the ventilation system is defective, since otherwise apartment occupants would risk asphyxiation by combustion gazes that would then be forced back into the apartments. Normal operation of the ventilation system is detected by means of a depression sensor or pressure sensitive switch placed within the ventilation duct, which causes the boilers to stop when the depression is no longer detected. It is therefore critical to ensure that an adequate depression is generated in each ventilation duct, that any fault be signaled in the shortest possible time to the maintenance company, and that the latter rapidly intervenes in order to repair the installation.

In this context, according to the present invention, potentially dangerous installations can be detected. In addition, by means of the present invention, the complete scale of repairing or servicing times can thus be specified in the maintenance contract and its execution by the maintenance company can be checked by the system according to this invention.

Advantageously, the transmissions between local units and the maintenance company and managing company's computers are performed via a basic transmission network, which can be the public switched telephone network, a radio network or else, a wired network, the system according to the invention further comprising means for setting-up a connection between the local units and the computers through a back-up radio telephone network, for example of the cellular type, connected to the basic network when the remote units cannot access the basic network used.

According to another feature of the invention, each local unit comprises means for connection to a data transmission unit, which unit comprises means for transmission over the basic network and the back-up radiotelephone network.

Thus, a single transmission unit can be connected to several local units installed at the same location, so that large savings in transmission devices are made possible.

According to another feature of the invention, each local unit also comprises means for detecting faults relating to its own operation and for transmitting malfunction information if such faults are detected, to a computer made available to a maintenance operator of the management system according to the invention.

An embodiment of the system according to the present invention will be described below by way of non-limiting example with reference to the appended drawings.

BRIEF DESCRIPTION OF THE DRAWINGS

FIG. 2 is a detailed schematic view of a local unit in the system shown in FIG. 1;

FIGS. 3a to 3c are block diagrams of the fault detection processes carried out by the local units.

DESCRIPTION OF THE PREFERRED EMBODIMENTS

Figure 1:
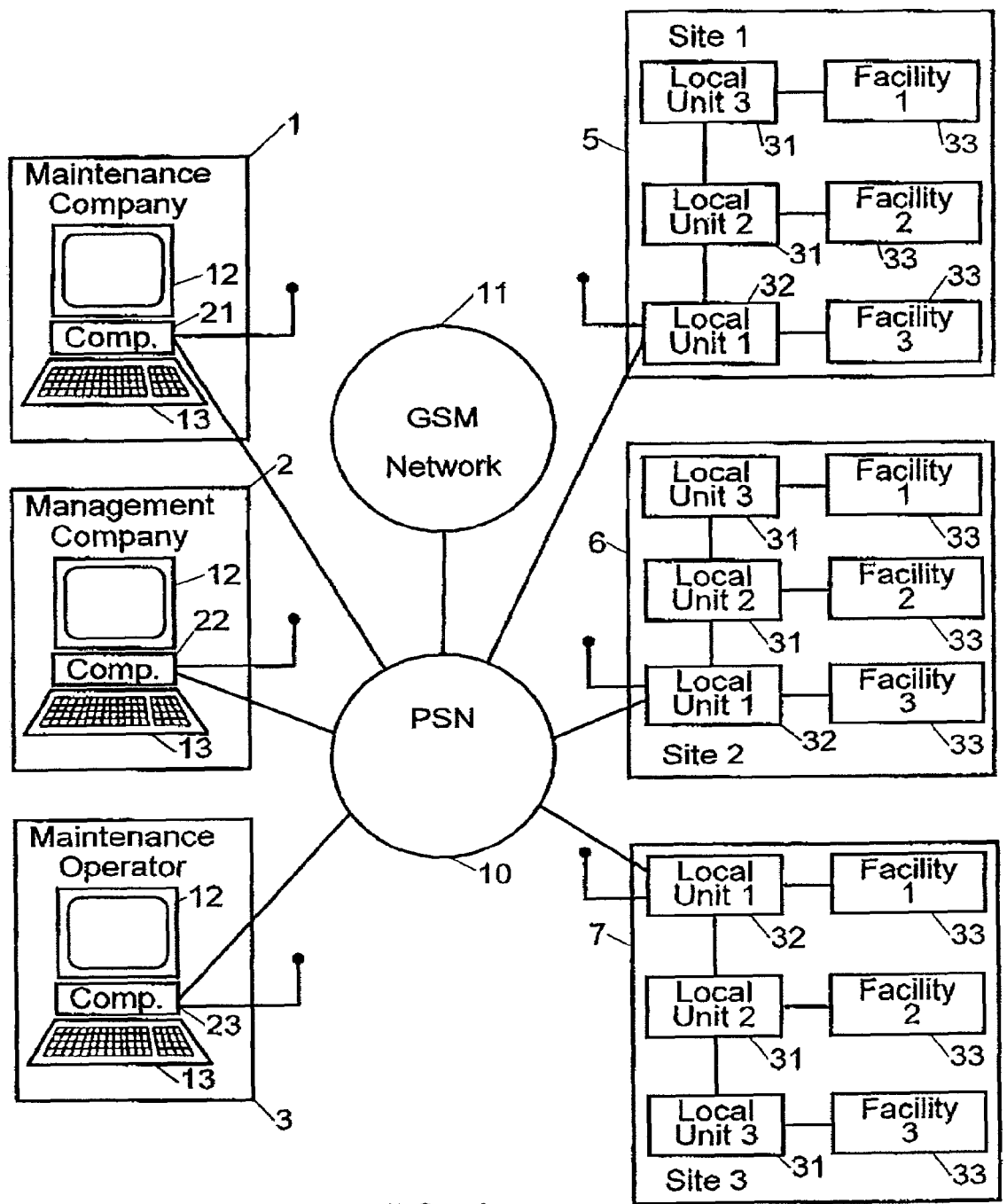
FIG. 1 is a schematic illustration of a facility maintenance managing system according to the present invention.

FIG. 1 shows a system designed for monitoring and managing the maintenance of a set of facilities 33 distributed among several far apart sites 5, 6, and 7. These facilities can for example be elevators, force-ventilation systems, air-conditioning or heating systems, or else parking lot gates or barriers.

According to the invention, each facility 33 is associated with a local fault detection and processing unit 31, 32, at least one local unit 32 on each site 5, 6, 7 being equipped with a telephone transmitter for transmitting the detected faults to a computer 21 made available to a company 1 maintaining the facilities 33, and to a computer 22 made available to a manager or user company 2 which has contracted out the mission of ensuring appropriate operation and maintenance of the facilities to the maintenance company.

The maintenance of the monitoring system is ensured by a maintenance operator 3 in charge of the system which is advantageously equipped with a computer 23 receiving all malfunction indications from local units 31, 32, which also transmit them through the telephone network 10.

Transmissions between local units 32 and computers 21, 22, 23 are ensured by means of a wired or switched telephone network 10 and in case it is impossible to set-up a direct telephone link, through a radiotelephone network 11 such as the GSM network, linked to the telephone network 10.

Computers 21, 22, 23 are provided with a modem connected to the network 10. They can also be equipped with an additional modem so that they can directly receive communications transiting over the network 11.

For economy reasons (in order to restrict the number of telephone subscriptions), a single local unit 32 for each site is equipped with a telephone transmitter and a GSM transmitter, while the other local units 31 on the site are connected to the local unit 32, which carries out the transmission of detected fault and failure information.

Computers 21, 22, 23 are for example microcomputers such as a PC provided as usual with a keyboard 13, a display monitor 12 and modems for setting-up communications via networks 10 and 11.

In FIG. 2, each local unit 31, 32 comprises a monitoring unit 41 including a processor such a microcontroller and memories, input units 42, 43 having several (for example four) input channels for connection to on-off or analogue measurement points or also to sensors placed on the facility 33 to be monitored, output units 44 for applying on-off commands to the facility 33, a power supply 46 designed for being connected to an electricity distribution network and comprising, for example, a back-up battery with a charger circuit, all of which units 41 to 46 are interconnected through a parallel bus 48.

The output units 44 allow tests to be carried out, for example on the monitor facility 33, by sending commands to this facility and measuring its responses to these commands using the input units 42, 43.

The monitoring unit 41 is connected to control and display devices 45 arranged on the front panel of a casing enclosing units 41 to 46 of the local unit, and is provided with a link 47 which can be of the serial type, for communicating with other local units 31, 32 installed on the same site, this serial link being connected for that purpose to a connection socket external to the casing designed to be coupled to the other local units 31, 32 on the site.

According to the present invention, the control and display devices 45 are designed for allowing a maintenance engineer to signal the beginning and end of his servicing on the facility, which information is transmitted to the maintenance and manager companies' computers 21, 22.

In case the local unit is coupled to several facilities or when the local unit is installed on a site not easily accessible or remote from the monitored facility, a remote control and display device could be provided, connected to the local unit and installed close to the facility.

Moreover, those local units 32 that are equipped with transmission means further comprise a central processing unit 50 and a circuit 52 forming an interface with a radio telephone communication modem 53, which are also coupled to the parallel bus 48, the central processing unit 50 being further connected to a modem 51 designed for connection to the telephone network 10.

The central processing unit 50 also comprises a processor, for example of the microcontroller type, and memories, and is connected to the serial link 47 connected to the monitoring unit 41. It further comprises a real-time clock for time stamping the various events that are detected by the on-site local units 31, 32 and transmitted through the serial link 47.

It carries out a regular enquiry of the monitoring units 41 via the serial link 47 for receiving the malfunction and fault information detected by the on-site local units 31, 32, and transmits these faults to the computers 21, 22, and possibly, 23, using the modem 51 or the interface circuit 52 and the modem 53.

The radiotelephone communication interface circuit 52, also based on a microcontroller, controls the modem 53 and the transmission thereto of information received from the bus 48. It can also be equipped with a back-up battery and an associated battery charger, for supplying the interface 53 and the modem 54 with electrical power in case of power failure on the electrical network, or in case of malfunction of the power supply circuit 46 or units 41 or 50. In this way, the interface circuit 53 can signal to the computer 23 that the local unit 32 is malfunctioning.

Modem 54, for example of the GSM type, is connected to an antenna external to the housing of local unit 32.

FIGS. 3a to 3c show the processes carried out by the monitoring units 41 in the local units 31, 32 for detecting, validating, and signaling malfunctions of the monitored facilities 33.

According to this invention, the detection of a malfunction on a facility triggers, in the associated monitoring unit, a procedure 100 in which a first timer $T_1$ is started (steps 101 and 103). The duration of timer $T_1$ is defined as a function of the detected fault. It is generally on the order of a few tens of seconds.

If the first timer $T_1$ times out (step 103) without the fault disappearing (step 102), it is considered that a malfunction has been detected. In this case, the monitoring unit 41 stores (step 104) the fault in a log (comprised of a FIFO stack, for example) and starts (steps 105, 106) a second timer $T_2$. The time out of this second timer is a few minutes.

If the second timer $T_2$ times out without the fault having disappeared, it is considered that the malfunction is not transient and must be notified to the maintenance company 1 or the maintenance operator 3 and to the managing company 2. In this case, a procedure 110 is executed by the monitoring unit 41, which procedure consists in testing (111), when relevant, the facility (if the facility is malfunctioning) by sending it a remote command through the output unit 44, and if the fault is still present (112), in transmitting (106) the fault information to the central processing unit 50 on the site 5, 6, 7 via the serial link 47, so that it can be subsequently transmitted to computers 21 and 22 or 23, according to whether the type of fault relates to the facility or the local unit.

In this manner, it can be made sure that the faults transmitted to the computers 21 to 23 are not transient faults or false alarms. In particular, this provision allows unnecessary visits by maintenance personnel to be avoided.

Detecting the disappearance of a fault, which may possibly occur after the maintenance engineer has left, causes the monitoring unit 41 to execute a procedure 120. This procedure first consists in starting a third timer $T_3$ (steps 121 to 123).

If timer $T_3$ times out (step 123) without the fault having disappeared (step 122), the monitoring unit 41 may test 124 the facility by sending it a fault command from an output unit 44, and if the fault is still not present 125, it transmits (126) the fault disappearance to the central processing unit 50 on the site 5, 6, 7 over the serial link 47, so that it can be transmitted to computers 21 and 22 or 23. If, in contrast, the malfunction occurs again during the timing period $T_3$ (step 122) or after the facility has undergone testing, the monitoring unit 41 again executes procedure 100 for processing the malfunction occurrence. The timer $T_3$ also has a duration of a few minutes.

If the detected malfunctions relate to local units 31, 32, they are notified to the system maintenance operator 3 and when appropriate, to the managing company 2.

It should be noted that the malfunction processing procedure 100 is executed on each occurrence of a new malfunction. As a consequence, several procedures 100 can be active at a given time.

Figure 4A:
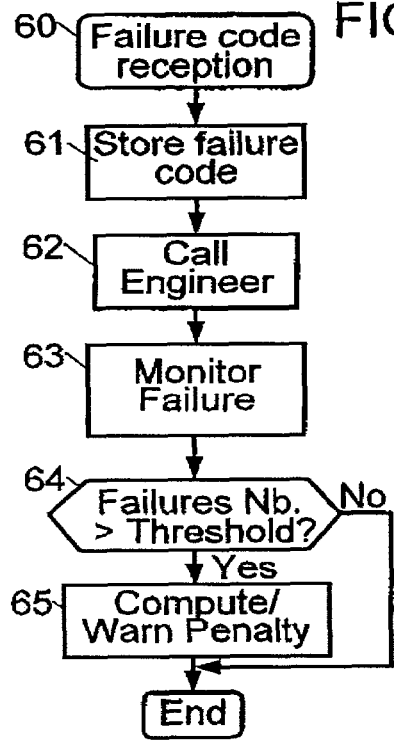
FIGS. 4a to 4c are block diagrams of the management operations carried out by the maintenance and operating computers in the system shown in FIG. 1.
Figure 4B:
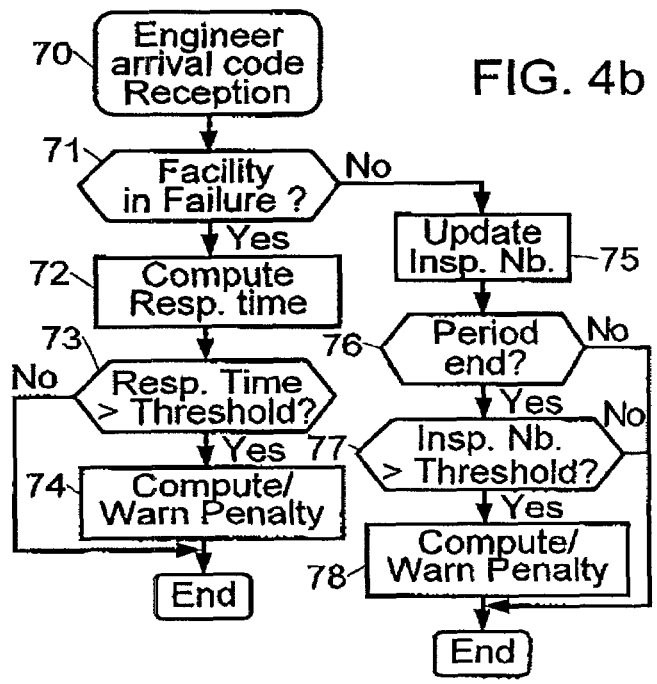
Figure 4C:
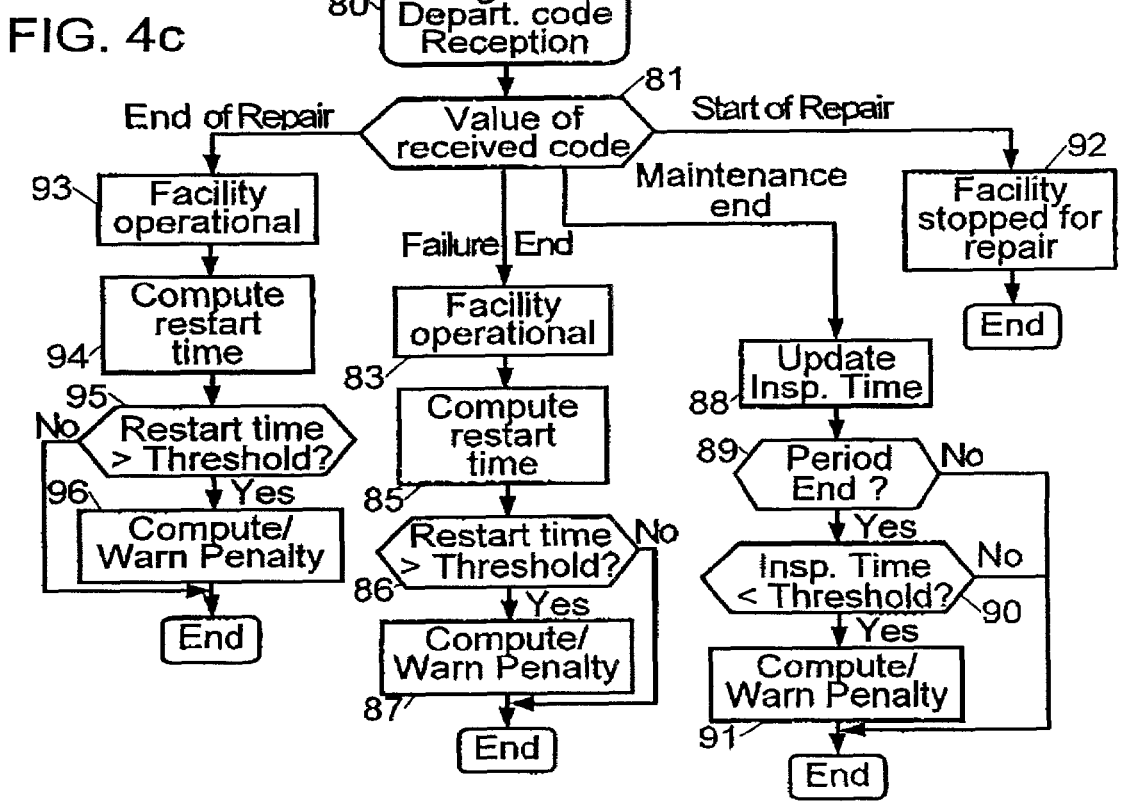

FIGS. 4a to 4c show the processes carried out by the maintenance and managing companies' computers 21, 22. These processes aim at guaranteeing that the maintenance company provides a maintenance service corresponding to its commitments towards the management company.

FIG. 4a shows the procedure 60 executed by computers 21, 22 when receiving a message notifying a failure affecting facility 33, which is transmitted from a local unit 32 when timer $T_2$ has timed out. This failure is first stored (step 61) in combination with its date and time, in a database where all necessary information on the monitored facilities and their respective conditions are collected. The time-stamping of failures may be performed by the computer 21, 22 or included in the failure message. In this case, it is preferable to provide a procedure that will be executed periodically for synchronizing the clocks of all local units with those of the computers.

The storing of a failure causes the status of the corresponding facility to be placed under monitoring 63, which monitoring allows, in particular, alarms to be triggered if the servicing response time exceeds a certain limit.

At the next step 62, the maintenance company's computer 21 triggers the call of a maintenance engineer requesting him to travel to the site and repair the facility detected as malfunctioning.

At step 64, computers 21, 22 determine from the information stored in the databases whether the number of failures per time unit (for example per year) for the facility in question exceeds a first predetermined threshold which, for example, may be provided in the maintenance contract binding the maintenance company to the managing company. If so, at step 65, the management company's computer 22 computes an amount of penalties to be applied to the maintenance company, while the company's computer 21 sends a warning signal indicating that the maintenance company will be subject to new penalties.

When arriving on site, the engineer actuates a control member on the front panel 35 or on a remote unit of the local unit associated with the facility declared to be malfunctioning, which causes an engineer arrival message to be sent to computers 21, 22, which message includes a code indicating whether the facility is malfunctioning or operating.

Receiving this message triggers a procedure 70 in the computers, as shown in FIG. 4b. If the received code indicates that the facility is malfunctioning (step 71), computers 21, 22 compute (72) the response time between the failure date and time and the engineer's response date and time (which times are given with an accuracy of one second), and if this response time is greater than a second predetermined threshold (step 73), the managing company's computer 22 computes an amount of penalties to be applied to the maintenance company, whereas the computer 21 sends a warning signal indicating that the maintenance company will be subject to new penalties (step 74). It should be noted that the second threshold may depend on the type of failure: for example, if the facility is an elevator and the signaled failure indicates that a person is caught in the elevator, the response time should obviously be very short, which is unnecessary if, in contrast, nobody is caught in the malfunctioning elevator.

If, at step 71, a maintenance operation is being performed (operating facility), the computers 21, 22 update (75) the number of inspections of the corresponding facility in the database. If it is the end of a predetermined time period, for example of one year (step 76), they compare (77) the new number of inspections with a third predetermined threshold, and if this number is smaller than the predetermined threshold, the managing company's computer 22 computes an amount of penalties to be applied to the maintenance company, whereas the maintenance company's computer 21 sends a warning signal indicating that the maintenance company will be subject to new penalties (step 78).

At the end of his maintenance or repair inspection, the engineer notifies his departure by means of the control member on the local unit 31, 32 associated with the facility 33 on which he had been working, and an engineer departure message is then sent to computers 21, 22. This action of the maintenance engineer may have previously triggered a series of automatic tests of the facility to check its proper functioning. The engineer departure messages comprise a code indicating the status of the associated facility. After the maintenance engineer has left, the facility can still be out of order. In this case, the code inserted into the departure message corresponds to a facility repair period. If the facility is functioning the code inserted into the message indicates that it has been restarted after repairing or servicing, or that it is the end of a normal maintenance inspection.

Additionally, between the times when a maintenance engineer has signaled the beginning and end of his inspection of a facility, the corresponding local monitoring unit 41 prevents the information relating to malfunctions, which would be detected during this time period, from being sent to the computers 21 to 23. Thus, the maintenance engineer may work freely, and the transmission of a large amount of unnecessary information is avoided.

When an engineer departure message is received the computers execute a procedure 80 as shown in FIG. 4c. This procedure first consists in reading the code received in the message.

If the received code relates to a start of repair, the facility is declared as being out of order for repair in the database (step 92). If the received code corresponds to the end of a maintenance inspection, computers 21, 22 update (88) an accumulated value of inspection times for the corresponding facility in the database. Moreover, if the end of a predetermined period (step 89) has been reached, this accumulated inspection duration is compared (90) with a fourth predetermined threshold, and if this accumulated duration is smaller than the fourth corresponding threshold, the managing company's computer 22 computes the amount of penalties to be applied to the maintenance company, whereas the maintenance company's computer 21 sends a warning signal indicating that the maintenance company will be subject to new penalties (step 91).

If the received code corresponds to the end of an inspection for restarting the facility following a malfunction, the computers 21, 22 update (83) the status of the corresponding facility, which is then declared as functioning in the database. The computers 21, 22 then determine (85) the facility restarting time elapsed since it has been declared as malfunctioning by the corresponding local monitoring unit 31, 32. If this duration is greater than a fifth predetermined threshold (step 86), the managing company's computer 22 computes an amount of penalties to be applied to the maintenance company, whereas the maintenance company's computer 21 sends a warning signal indicating that the maintenance company will be subject to new penalties (step 87).

If the received code corresponds to the end of an inspection for restarting the facility following a repair operation, the computers 21, 22 update (93) the status of the corresponding facility, which is then declared as operational in the data base, and determine (94) a time to restart relative to the date at which the facility had been declared out of order for repair. They then compare (95) this time to a sixth predetermined threshold and if this time is greater that the sixth threshold, the managing company's computer 22 computes an amount of penalties to be applied to the maintenance company, whereas the computer 21 sends a warning signal indicating that the maintenance company will be subject to new penalties (step 96).

Moreover, the interface circuit 52 is designed for periodically checks the modem 53 for its status and the availability status of the radiotelephone network 11. In case of prolonged unavailability, a network status message is transmitted to the computer 23 of the maintenance company in charge of the system through the switched telephone network 10. Similarly, in case of prolonged unavailability of a connection to the central processing unit 50, the interface circuit 52 decides to send a message to computer 23 to notify this fault.

The central processing unit 50 is programmed for using the switched telephone network 10 in priority, and for then using the radio telephone network 11 after a predetermined number (for example four) of unsuccessful attempts to connect to the computer 21, 22, 23 the message is being sent to. In case of failure, the message to be transmitted is sent to the interface circuit 52. In such a case, it may be envisioned to systematically send a message for notifying the loss of a PSN link with the computer 23 of the maintenance company in charge of the system.

The default or operating conditions of a facility are derived by the monitoring unit 41 in the corresponding local unit 31, 32, as a function of the signals received by the input units 42, 43.

For that purpose, the monitoring unit cyclically scans the states of the input channels of input units 42, 43, the state of facility 33 being determined as a function of the respective states of these channels.

Thus, in the case of a force-ventilation system installed in a building, it may be envisioned to measure the depression value at one or several measurement points in the system's ducts, the supply voltage of the ventilation motor and the supply voltage of the local units, for detecting a mains blackout as well as whether the DSC safety device that controls the stopping of heating boilers installed in a building, in case of system failure.

If the depression is insufficient, if the power supply voltages of the local unit 31, 32 and of the ventilation motor are present, and if the DSC safety device is not triggered, the monitoring unit 41 generates a malfunctioning ventilation and non-triggered DSC fault. This fault must be considered as overriding since it means that the building's heaters are in operation and that the combustion gazes are not evacuated.

If the depression is insufficient, if the power voltages of the local unit 31, 32 is present, and if the DSC safety device is triggered, the monitoring unit 41 generates a ventilation failure or ventilation motor supply voltage fault according to whether the motor is powered or not.

If the depression is insufficient, if the local unit 31, 32 is not powered and if the motor supply voltage is not present, the monitoring unit 41 generates a mains blackout fault.

If the depression is sufficient and if the DSC safety device is triggered, the monitoring unit 41 generates a DSC control circuit failure fault.

It then applies the delay times T1, T2 and T3 to these faults, as previously described with reference to FIGS. 3a to 3e. It should be noted in this regard that the different values of delay times $T_1$, $T_2$, $T_3$ may be respectively assigned to the above defined faults.

The invention claimed is:

1. A system for remotely and automatically controlling, by a facilities management company, maintenance of facilities by a maintenance company with regards to a contract binding the maintenance company to the facilities management company, said system comprising:

local monitoring units, each local monitoring unit being installed in close proximity to at least one piece of said facilities and associated thereto, each local monitoring unit comprising:

means for measuring operation parameters of the associated pieced of facilities for detecting an operational state thereof;

control means for allowing a maintenance technician to real time notify the start and the end time of his maintenance or repair task performed on the associated piece of facilities or to notify that the associated piece of facilities is out of order for a long period because works are in progress, said control means being independent from the operational state of the associated piece of facilities, a transmission network, and means for transmitting through said transmission network said detected operational state of said associated piece of facilities and said maintenance task start and end times;

a first and a second computer, each computer being connected to the local monitoring units through said transmission network and comprising means for receiving and processing said detected operational state and said maintenance task start and end times transmitted by the local monitoring units, and means for storing all information transmitted by the local monitoring units, said first computer being available to the maintenance company and being used to manage the maintenance of said facilities, and said second computer being available to the facilities management company and being used to automatically control the maintenance and repair tasks performed by the technicians of said maintenance company on said facilities with regards to their contractual obligations.

2. The system according to claim 1, wherein each of said local monitoring units comprises means for preventing the local monitoring unit from transmitting through said transmission network information relating to the detected operational state of the associated piece of facilities between said start and end times of said maintenance, repair or works task signaled using said control means.

3. The system according to claim 1, wherein each of said first and second computers is connected to a data base collecting all information relating to the facilities and the maintenance thereof, and the information transmitted by said local monitoring units.

4. The system according to claim 1, wherein the first and second computers comprise:

means for counting a number of maintenance tasks carried out for each piece of said facilities during a first period of time, for comparing said maintenance task number to a first threshold, and for displaying a first maintenance fault signal if the maintenance task number does not reach said first threshold at the end of said first period of time;

means for computing a total duration of the maintenance tasks performed on each piece of said facilities during a second period of time, for comparing said total duration to a second threshold, and for displaying a second maintenance fault signal if said total duration is not at least equal to said second threshold at the end of said second period of time;

means for computing an elapsed time between a time when a piece of said facilities is detected as malfunctioning and the start time of a repair task on said piece of facilities, for comparing said elapsed time with a third threshold, and for displaying a third maintenance fault signal when said elapsed time exceeds said third threshold; and means for comparing a restart time to put a piece of said facilities to a normal operational state after the start time of a repair task on said piece of facilities with a fourth threshold, and for displaying a fourth maintenance fault signal when said restart time exceeds said fourth threshold.

5. The system according to claim 4, wherein the second computer comprises means for computing penalties to be applied to the maintenance company if a maintenance fault concerning the exceeding of one of the four said thresholds have been detected by said second computer.

6. The system according to claim 4, wherein the first and second thresholds are set as a function of said facilities, and wherein the third and fourth thresholds are defined as a function of the detected malfunction or type of repair, said thresholds being as defined by a maintenance contract binding the maintenance company to the managing company.

7. The system according to claim 1, wherein transmissions between the local monitoring units and the first and second computers are carried out through a basic wire or radio telephone network and wherein the local monitoring units further comprise means for setting-up a link between the local monitoring units and the first and second computers through a radio telephone network, when the local monitoring units cannot access a basic telephone network.

8. The system according to claim 7, wherein at least one local monitoring unit of a group of said local monitoring units which are installed close from one another comprises a data transmission unit, wherein said data transmission unit comprises means for transmission over the basic telephone network and means for transmission over the radio telephone network, and wherein other local monitoring units of the site comprising means for connection to said data transmission unit.

9. The system according to claim 8, wherein the radio telephone network transmission means in the data transmission unit are provided with a backed-up power supply for sending a power supply fault message when the local monitoring unit is no longer powered.

10. The system according to claim 1, wherein each of said local monitoring units comprises means for detecting internal faults pertaining to operation of said local monitoring unit, and means for sending malfunction information to a third computer if such internal faults are detected, said third computer being connected to the local monitoring units through said transmission network and comprising means for receiving and processing and storing into a database the internal malfunction information transmitted by the local monitoring units.

11. The system according to claim 1, wherein each of said local monitoring units comprises:
   means for starting a first timer after a malfunction has been detected on the associated piece of facilities;
   means for starting a second timer if the first timer has timed out without the corresponding fault having disappeared;
   means for sending a malfunction message to the first and second computers if the second timer has timed out without the corresponding fault having disappeared;
   means for starting a third timer after a fault has disappeared; and
   means for transmitting a fault disappearance message if the third timer has timed out without the corresponding fault reoccurring.

12. The system according to claim 11, wherein a respective duration for each of the first, second and third timers is determined independently from each other as a function of each malfunction type.

\* \* \* \* \*